United States Patent
Sharma et al.

(10) Patent No.: US 10,326,670 B2
(45) Date of Patent: Jun. 18, 2019

(54) SYSTEM AND METHOD FOR ENTERPRISE DATA DISTRIBUTION

(71) Applicant: Oracle International Corporation, Redwood Shores, CA (US)

(72) Inventors: Mayank Sharma, Bangalore (IN); Matheen Shaik, Bangalore (IN); Chiranjeevi Bhagavan, Bangalore (IN); Dhanavel Karthikeyan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 143 days.

(21) Appl. No.: 15/434,646

(22) Filed: Feb. 16, 2017

(65) Prior Publication Data
US 2018/0234510 A1    Aug. 16, 2018

(51) Int. Cl.
| | | |
|---|---|---|
| G06F 17/30 | (2006.01) | |
| G06F 7/00 | (2006.01) | |
| G06F 21/62 | (2013.01) | |
| H04L 12/24 | (2006.01) | |
| G06F 16/28 | (2019.01) | |
| G06F 8/00 | (2018.01) | |
| G06F 9/54 | (2006.01) | |
| G06F 16/25 | (2019.01) | |

(Continued)

(52) U.S. Cl.
CPC ............ *H04L 41/5096* (2013.01); *G06F 8/00* (2013.01); *G06F 9/541* (2013.01); *G06F 16/25* (2019.01); *G06F 16/285* (2019.01); *H04L 41/5051* (2013.01); *H04L 67/02* (2013.01); *H04L 67/12* (2013.01)

(58) Field of Classification Search
USPC .................................................. 709/222–224
See application file for complete search history.

(56) References Cited

U.S. PATENT DOCUMENTS 8,032,397 B2 * 10/2011 Lawless ............. G06F 19/3418
  705/3
2009/0254572 A1 * 10/2009 Redlich ................ G06Q 10/06

(Continued)

OTHER PUBLICATIONS

XIGNITE®, Xignite, Inc., Overview, Enterprise Data Distribution, © Xignite, Inc. 2013, 4 pages.

(Continued)

*Primary Examiner* — Jude Jean Gilles
(74) *Attorney, Agent, or Firm* — Tucker Ellis LLP

(57) ABSTRACT

In accordance with accordance, described herein is a system and method for providing a cloud service for distributing enterprise data to data consumers for reuse. The cloud service can include a generic connector interface configured to retrieve enterprise data from a PaaS service, and a plurality of services used for categorizing the enterprise data, managing identities of the data consumers, configuring data access rules, and masking the enterprise data. A plurality of representational state transfer (REST) application programming interfaces (APIs) can be exposed by the cloud service for a tenant to manage the enterprise data and data consumers, and for data consumers to subscribe to the enterprise data. The system allows a PaaS tenant to distribute enterprise data from a PaaS service to a plurality of data consumers securely and scalably.

20 Claims, 12 Drawing Sheets

(51) Int. Cl.
*H04L 29/06* (2006.01)
*H04L 29/08* (2006.01)

(56) References Cited

U.S. PATENT DOCUMENTS

| | | | | |
|---|---|---|---|---|
| 2010/0250497 | A1* | 9/2010 | Redlich | F41H 13/00 707/661 |
| 2015/0067761 | A1* | 3/2015 | Bade | H04L 63/20 726/1 |
| 2015/0154293 | A1* | 6/2015 | Lu | G06Q 10/00 707/770 |
| 2015/0277399 | A1* | 10/2015 | Maturana | G06F 9/5072 700/29 |
| 2015/0277406 | A1* | 10/2015 | Maturana | G05B 19/0423 700/83 |
| 2015/0281233 | A1* | 10/2015 | Asenjo | G06F 21/44 726/7 |
| 2015/0286898 | A1* | 10/2015 | Di | G06K 9/46 382/224 |
| 2016/0335454 | A1* | 11/2016 | Choe | G06Q 30/018 |
| 2017/0041296 | A1* | 2/2017 | Ford | G06F 16/951 |
| 2017/0131974 | A1* | 5/2017 | Balasubramanian | G06F 3/0482 |

OTHER PUBLICATIONS

XIGNITE®, Xignite, Inc., Market Data Cloud, © Xignite, Inc. 2013, 1 pages.
XIGNITE®, Xignite, Inc., Overview, Market Data Distribution, © Xignite, Inc. 2013, 4 pages.

* cited by examiner

Tenant User Interface 103

| Category 419 | Data source 421 | PaaS service 423 | Table 425 | Throttle limit 427 |
|---|---|---|---|---|
| Tyre | NOSQL | IOT | Tyres | 2 |
| Propellers | NOSQL | IOT | Wings | 2 |
| Radar | NOSQL | IOT | CollisionAvoidance | 2 |
| LandingGear 437 | NOSQL | IOT | Tyres | 2 |
| Engine | NOSQL | IOT | JetEngine | 2 |
| Fuselage | NOSQL | IOT | Payload | 2 |
| Feed | NOSQL | IOT | Fuel | 2 |

Tenant 101

*FIGURE 5A*

SYSTEM AND METHOD FOR ENTERPRISE DATA DISTRIBUTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud services, and are particularly related to a system and method for providing a cloud service for distributing enterprise data.

BACKGROUND

The term "cloud computing" is generally used to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. Generally, a cloud computing model enables some of those responsibilities which previously may have been provided by an organization's own information technology department, to instead be delivered as service layers within a cloud environment, for use by consumers (either within or external to the organization, according to the cloud's public/private nature).

As an illustrative example, a cloud computing model can be implemented as Platform as a Service (PaaS), in which consumers can use software programming languages and development tools supported by a PaaS provider to develop, deploy, and otherwise control their own applications, while providers manage or control other aspects of the cloud environment (i.e., everything below the run-time execution environment). In addition, the providers can provide support to satisfy a service's infrastructural requirements.

Organizations that use PaaS services can own huge amounts of data generated from the PaaS services. Other than being used for various data warehousing needs and analytics, the data often becomes latent and idle, and does not provide much value to the organizations.

SUMMARY

In accordance with accordance, described herein is a system and method for providing a cloud service for distributing enterprise data to data consumers for reuse. The cloud service can include a generic connector interface configured to retrieve enterprise data from a PaaS service, and a plurality of services used for categorizing the enterprise data, managing identities of the data consumers, configuring data access rules, and masking the enterprise data. A plurality of representational state transfer (REST) application programming interfaces (APIs) can be exposed by the cloud service for a tenant to manage the enterprise data and data consumers, and for data consumers to subscribe to the enterprise data. The system allows a PaaS tenant to distribute enterprise data from a PaaS service to a plurality of data consumers securely and scalably.

BRIEF DESCRIPTION OF THE FIGURES

FIGS. 5A-5C illustrate example user interfaces for use by a data consumer, in accordance with an embodiment.

DETAILED DESCRIPTION

Figure 1:
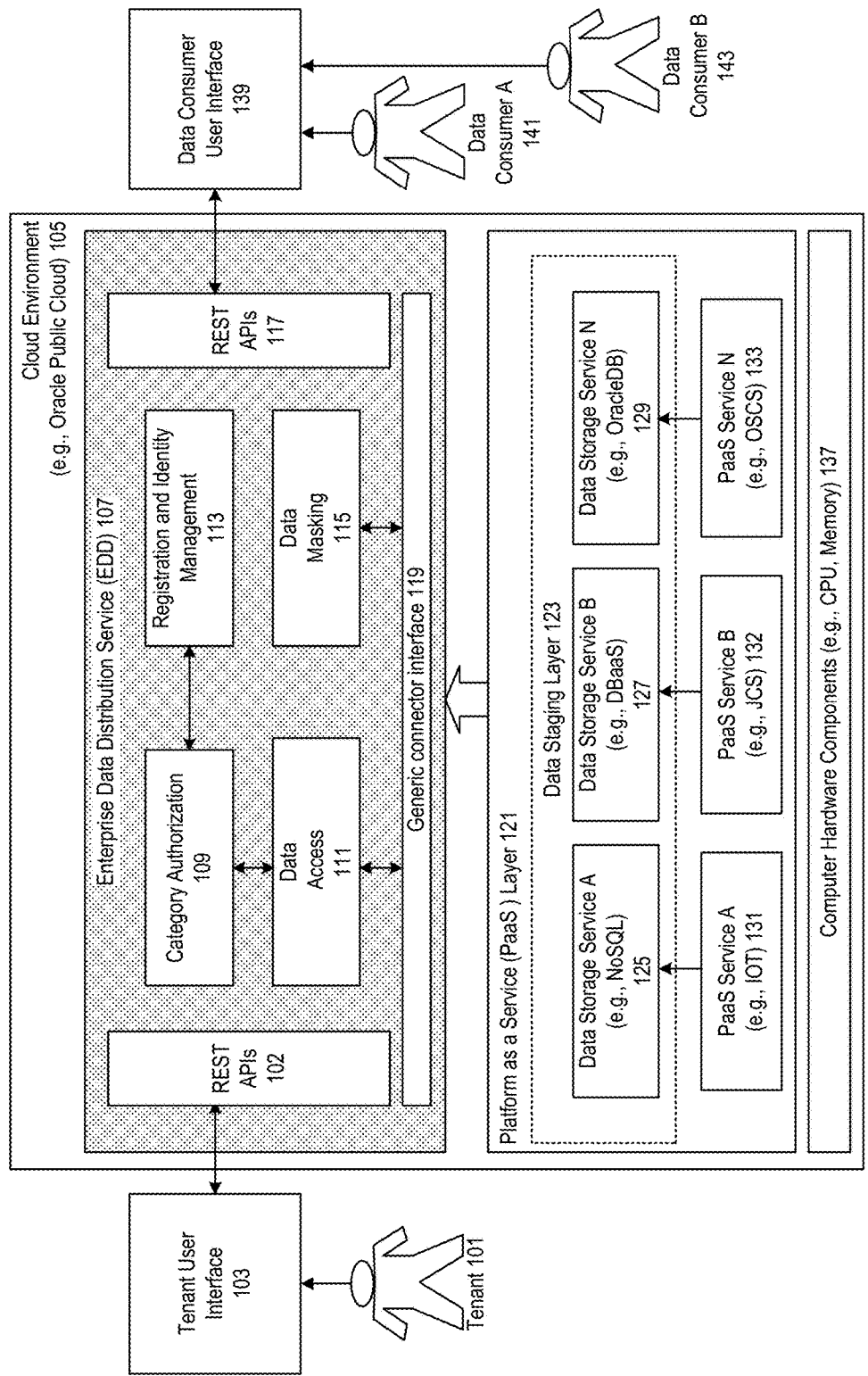
FIG. 1 illustrates a system for distributing enterprise data using a cloud service, in accordance with an embodiment.

As described above, a cloud computing environment (referred to herein in some embodiments as a cloud environment, or cloud) can generally include a combination of one or more Infrastructure as a Service (IaaS), Platform as a Service (PaaS), and/or Software as a Service (SaaS) layers, which can be delivered as service layers within the cloud environment.

In accordance with an embodiment, the cloud environment can be implemented as a system that includes a computer hardware, such as one or more conventional general purpose or specialized digital computers, computing devices, machines, microprocessors, memory and/or computer readable storage media.

In accordance with an embodiment, each of the IaaS, PaaS, and/or SaaS layers can generally include a variety of components.

For example, in accordance with an embodiment, the IaaS layer can include a shared database hardware (e.g., an Exadata machine), and/or shared application server hardware (e.g., an Exalogic machine); while the PaaS layer can include one or more PaaS services, such as a database service, application server service, and/or WebCenter service; and the SaaS layer can include various SaaS services, such as enterprise applications (e.g., Oracle Fusion SaaS), and/or ISV or custom applications. The cloud environment can also include a shared enablement and managing infrastructure, which provides enablement and management tools that support the various service layers, for example, identity management, virtual assembly building, system provisioning, tenant management, or other components.

In accordance with an embodiment, the cloud environment can include a PaaS platform layer, which enables the provisioning of enterprise software applications within the environment. For example, the PaaS platform can be provided as an installable software suite that provides a self-service provisioning experience for enterprise applications such as Fusion Middleware (FMW).

A PaaS service can generate huge amount data, which is usually stored away in historic records databases. The data can be later used for Online Analytical Processing processes (OLAP) for various data warehousing needs and traditional analytics. However, the data may not be of much value other than internal auditing and historic logs once it has been used for OLAP.

In accordance with accordance, described herein is a system and method for providing a cloud service for distributing enterprise data to data consumers for reuse. The cloud service can include a generic connector interface configured to retrieve enterprise data from a PaaS service, and a plurality of services used for categorizing the enterprise data, managing identities of the data consumers, configuring data access rules, and masking the enterprise data. A plurality of representational state transfer (REST) application programming interfaces (APIs) can be exposed by the cloud service for a tenant to manage the enterprise data and data consumers, and for data consumers to subscribe to the enterprise data. The system allows a PaaS tenant to distribute enterprise data from a PaaS service to a plurality of data consumers securely and scalably.

As used herein, in accordance with an embodiment, the term "enterprise data" or "data" refers to data stored in various schemas by a tenant of a PaaS service. The data can be provided to data consumers as an on-demand entity, for which the tenant can bill the data consumers for data subscription. A tenant of a PaaS service is a person or entity that owns an instance of the PaaS in a cloud environment, and has backed up data from the PaaS instance using a data storage service in the cloud environment. A data consumer is a person or entity that subscribes to enterprise data through the cloud service. A data consumer can be considered a tenant of a PaaS tenant.

In accordance with an embodiment, the system and method described herein can provide a data as a service (DaaS) that allows a PaaS tenant to host its own real time and historical enterprise cloud data, and to expose the enterprise data to a plurality of data consumers that register with the cloud service and subscribe to the enterprise data. The plurality of data consumers can reuse the data for their machine learning (ML) and analytics pipelines.

In accordance with an embodiment, using the features described above, the enterprise data can be provided to the plurality of data consumers as an on demand entity, for which each data consumer can be billed for consumption of the data. As such, data that would have been idle can be shared and monetized securely and scalably.

As an illustrative example, an aircraft manufacturer can use parts that are developed by vendors who sell their parts to the aircraft manufacturer. The aircraft manufacturer can log and collect data of the performance of various parts of its aircrafts. The data usually stays idle after the initial Online Analytical Processing processes (OLAP).

The aircraft manufacturer can be a tenant of a cloud service provider, and has various parts of its aircraft enabled by Internet of Things (IOT). The data generated by the IOT-enabled parts can be stored on a real-time basis in an IOT PaaS service provisioned in a cloud environment.

A vendor of a particular part would be interested in the performance of one or more parts of the aircraft, so that the vendor can analyze the performance and improve their products or point out issues in a competitor's parts.

In the above example, the aircraft manufacture is a PaaS tenant, a vendor of parts is a data consumer, and the enterprise data is the data generated by the 10T-enabled parts. The aircraft manufacturer can partition its enterprise data, and expose various products/component data for consumption by the data consumers.

The system and method can benefit both the PaaS tenant and the data consumer. For example, a data consumer/vendor can use the data for its machine learning (ML) and analytics pipelines to improve the services and products that the data consumer offers. The aircraft manufacture can benefit from the improved services and products.

Enterprise Data Distribution Service

FIG. 1 illustrates a system for distributing enterprise data using a cloud service, in accordance with an embodiment.

As shown in FIG. 1, an enterprise data distribution service 107 can be provided as a data as a service (DaaS) on top of a platform as a service (PaaS) layer 121 in a cloud environment 105, which can execute on computer hardware components 137.

The PaaS layer can include a plurality of PaaS services, for example, PaaS service A 131, PaaS service B 132, and PaaS service N 133. Each PaaS service can store its enterprise data to a data storage service.

As shown in FIG. 1, PaaS service A can be an Internet of Things (IOT) service, and can use data storage service A 125, for example, a NoSQL data storage service, to store enterprise data from the IOT service. PaaS service B can be a Java Cloud Service (JCS), and can use data storage service B 127, for example, a database as a service (DBaaS), to store enterprise data from the JCS service. PaaS service N can be an Oracle Storage Cloud Service (OSCS), and can use data storage service N 129, for example, an Oracle Database service (OracleDB), to store enterprise data from the OSCS.

The data storage service associated with each PaaS service is provided as an example. Any schema as a service can be used by each of the plurality of PaaS services to store enterprise data from the PaaS service.

In accordance with an embodiment, the enterprise data distribution (EDD) service 107 can include a generic connector interface 119 for use in retrieving data from endpoint tables in the data staging layer 123. The endpoint tables for each data storage service can be exposed for access by the EDD service. To the EDD, each data storage service is a data source that exposes its endpoints table for access by the EDD.

In accordance with an embodiment, the generic connector interface can be an in-built connector interface to interface with various data sources available in the data staging layer. To connect to a particular data source, a tenant 101 of a PaaS service can provide connection details for a data source, and the EDD can automatically provide the required bootstrapping to connect the EDD to the data source, perform schema discovery in the data source, and expose enterprise data in the data source at a data consumer user interface 139 as "CATEGORIES" to a plurality of data consumers, for example, data consumer A 141, and data consumer B 143.

In accordance with an embodiment, an implementation of the connector interface for each of the plurality of data sources can be provided, so that a uniform user interface can be displayed to a PaaS tenant regardless of which data source the EDD is configured to connect to.

For example, the uniform user interface provided by the connector interface can include a host name field, a port number field, and a database name field. The host name field can receive, from the PaaS tenant, an input for an URL specifying a computer node on which the data source is running. An example input for the field can be "slc10bvf.us.oracle.com". The port number field can receive an input specifying a port number for connecting to the data source. Similarly, the database field can receive input for a database name associated with the data source.

As further shown, the EDD can include a plurality of software components, for example, a registration and identity management component 113, a category authorization component 109, a data access component 111, and a data masking component 115. Each of the plurality of software components can be a service that includes one or more web services.

In accordance with an embodiment, the registration and identity management component can provide facilities to register and manage identities of various data consumers, who can register with the EDD to access enterprise data from a PaaS service in the PaaS layer.

In accordance with an embodiment, the registration and identity management component can represent an identity management (IDM) cloud service, for example, Oracle™ IDM cloud service; or an IDM tenant POD (point of deployment). The IDM tenant POD can represent a logical entity that houses one or more IDM cloud service instances that can be created on-demand for a given PaaS tenant.

In accordance with another embodiment, the registration and identity management component can include a service for use by data consumers to register themselves with the EDD, and a separate service for use by the PaaS tenant to manage identities of registered data consumers using a plurality in-built identity management rules.

In accordance with an embodiment, the category authorization component allows the PaaS tenant to grant access to enterprise data of various categories via a tenant user interface 103. The category authorization component can represent one or more services configured to receive a request from a data consumer for accessing a particular category, and to grant or deny access to the category. The request for access for the data category can be made by a data consumer using a REST API call, e.g., a GET call.

In accordance with an embodiment, the data access component can be used to access and package data, and prepare the enterprise data for being transmitted to a data consumer in response to a REST API call. The component can handle data querying details, and can mask fields defined for a particular category before the enterprise data is exposed to a data consumer. The component can use the generic connector interface described above to connect to one or more data sources and query enterprise data in the data sources.

In accordance with an embodiment, the data masking component can expose one or more REST APIs for the PaaS tenant to define fields to be masked for a schema of a particular category. Additionally, the data masking component can perform other manipulations of enterprise data before the enterprise data is sent to a plurality of data consumers in response to one or more REST API calls.

REST APIs

In accordance with an embodiment, each of the plurality of services in the plurality of software components can be exposed through one or more REST APIs. As used herein, a REST API can define a set of functions that a developer can use to perform requests and receive responses via HTTP protocol such as GET and POST. Since a REST API uses HTTP, it can be used by any programming language. A client that issues a REST API call and a server that receives the REST API call can be independent of each other, allowing the client and the server to be coded in different languages.

In accordance with an embodiment, the EDD can include REST APIs 117 for public access by data consumers, and REST APIs 102 for use by a PaaS tenant. The REST APIs 117 and REST APIs 102 can expose functionalities provided the plurality of software components in the EDD, and can integrate the plurality of software components with each other and with a user interface.

In accordance with an embodiment, the REST APIs 102 can integrate the EDD with the tenant user interface 103. Listing 1 illustrates an example list of the REST APIs 102.

| | | Listing 1 | |
|---|---|---|---|
| Group | HTTP Method | API (Base URI: http://\<host\>:\<port\>/messenger/EDD) | Access |
| Category | GET | /category | Internal |
| | GET | /category/{categoryName} | Internal |
| | POST | /category | Internal |
| | PUT | /category/{categoryName} | Internal |
| | GET | /category/{categoryName}/test | Internal |
| Vendor (i.e. Data Consumer) | GET | /vendor | Internal |
| | GET | /vendor/{vendorName} | Internal |
| | POST | /vendor | Internal |
| | PUT | /vendor/{vendorName} | Internal |
| | DELETE | /vendor/{vendorName} | Internal |
| Tables | GET | /tables | Internal |
| | GET | /tables/{tableName} | Internal |
| | POST | /tables | Internal |
| | PUT | /tables/{tableName} | Internal |

In accordance with an embodiment, the REST APIs in Listing 1 can be used to create the tenant user interface for use by a PaaS tenant. The tenant user interface enables a PaaS tenant to interface with the EDD, and use the functionalities exposed by the EDD.

Listing 2 illustrates an example list of the REST APIs 117, which can be exposed by the EDD for use by data consumers to register themselves, lookup up categories of enterprise data, request access for a particular category, and access the particular category of enterprise data.

| | | Listing 2 | |
|---|---|---|---|
| Group | HTTP Method | API (Base URI: http://\<host\>:\<port\>/messenger/EDD) | Access |
| Data | GET | /data | Public |
| | GET | /data/{categoryName}?start=\<DATE\>&end=\<DATE\> | Public |

In accordance with an embodiment, the REST APIs 117 can be integrated with the data consumer user interface 139, and can also be used directly in a client application developed by a particular data consumer.

Figure 2:
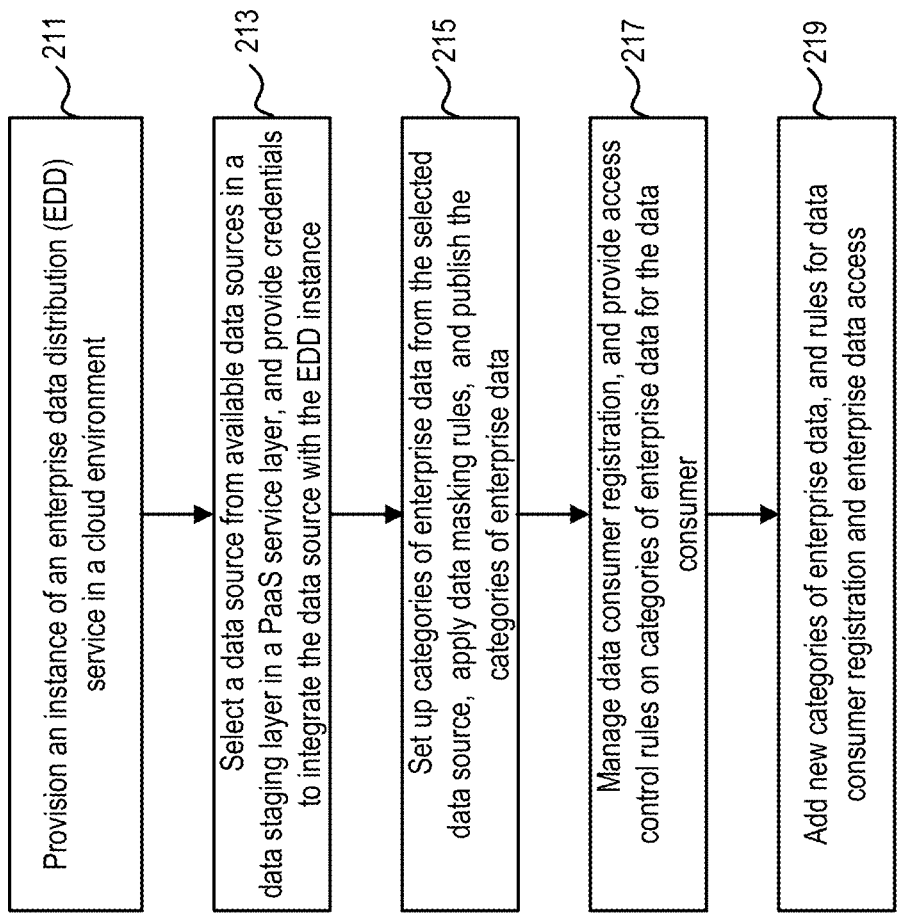
FIG. 2 illustrates a workflow process for a PaaS tenant in accordance with an embodiment.

FIG. 2 illustrates a workflow process for a PaaS tenant in accordance with an embodiment.

As shown in FIG. 2, at step 211, a PaaS tenant provisions an instance of an enterprise data distribution (EDD) service on top of a PaaS service in a PaaS service layer in a cloud environment.

At step 213, the PaaS tenant selects a data source from available data sources in a data staging layer in the PaaS service layer, and provides credentials to integrate the data source with the EDD instance.

At step 215, the PaaS tenant configures categories of enterprise data from the selected data source, applies data masking rules, and publishes the categories of enterprise data. The categories of enterprises can be provided by various warehousing tools in the data staging layer. Each category can correspond to a table in a particular data source. A table can correspond to more than one enterprise data categories.

At step 217, the PaaS tenant manages data consumer registration, and provides access control rules on categories of enterprise data for the data consumer.

At step 219, the PaaS tenant adds new categories of enterprise data, and rules for data consumer registration and enterprise data access.

Figure 3:
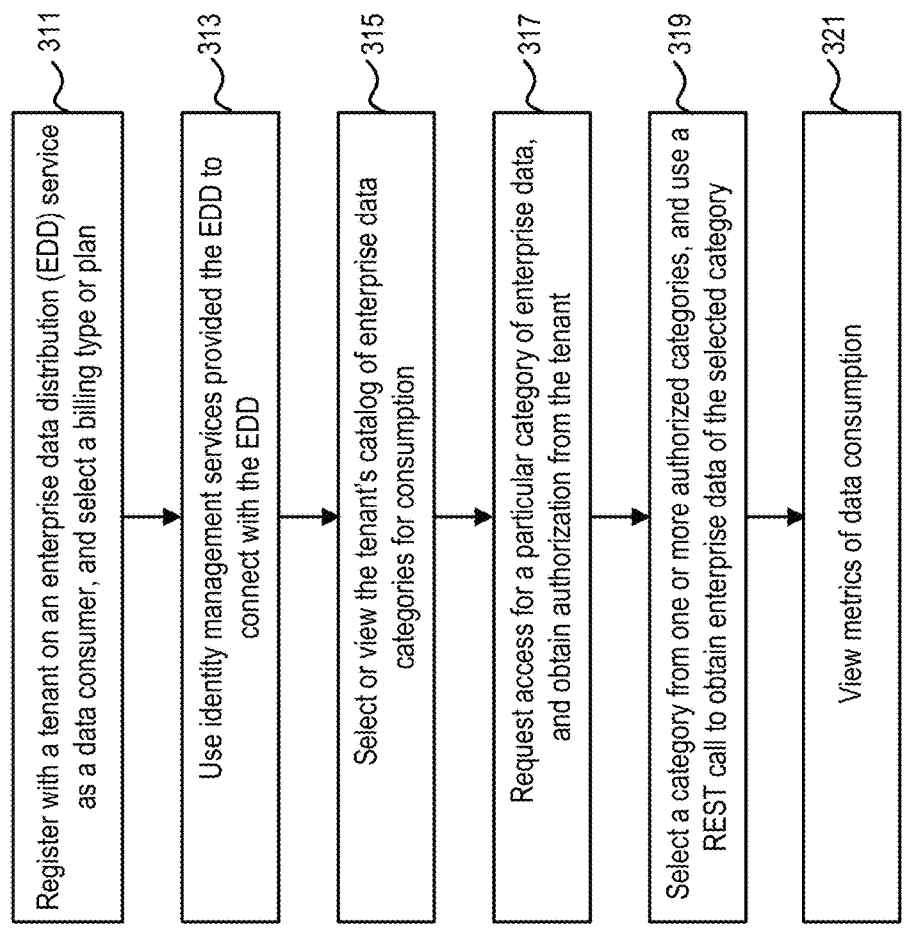
FIG. 3 illustrates a workflow process for a data consumer in accordance with an embodiment.

FIG. 3 illustrates a workflow process for a data consumer in accordance with an embodiment.

As shown in FIG. 3, at step 311, a data consumer registers itself with a tenant on an enterprise data distribution (EDD) service, and selects a billing type or plan.

At step 313, the data consumer uses identity management services provided with the EDD to connect with the EDD.

At step 315, the data consumer selects or views the tenant's catalog of enterprise data categories for consumption.

At step 317, the data consumer requests access for a particular category of enterprise data, and obtain authorization from the tenant.

At step 319, the data consumer selects a category from one or more authorized categories, and uses a REST call to obtain enterprise data of the selected category.

At step 321, the data consumer views metrics of its enterprise data consumption.

FIGS. 4A-4E illustrate example user interfaces for use by a PaaS tenant, in accordance with an embodiment.

Figure 4A:
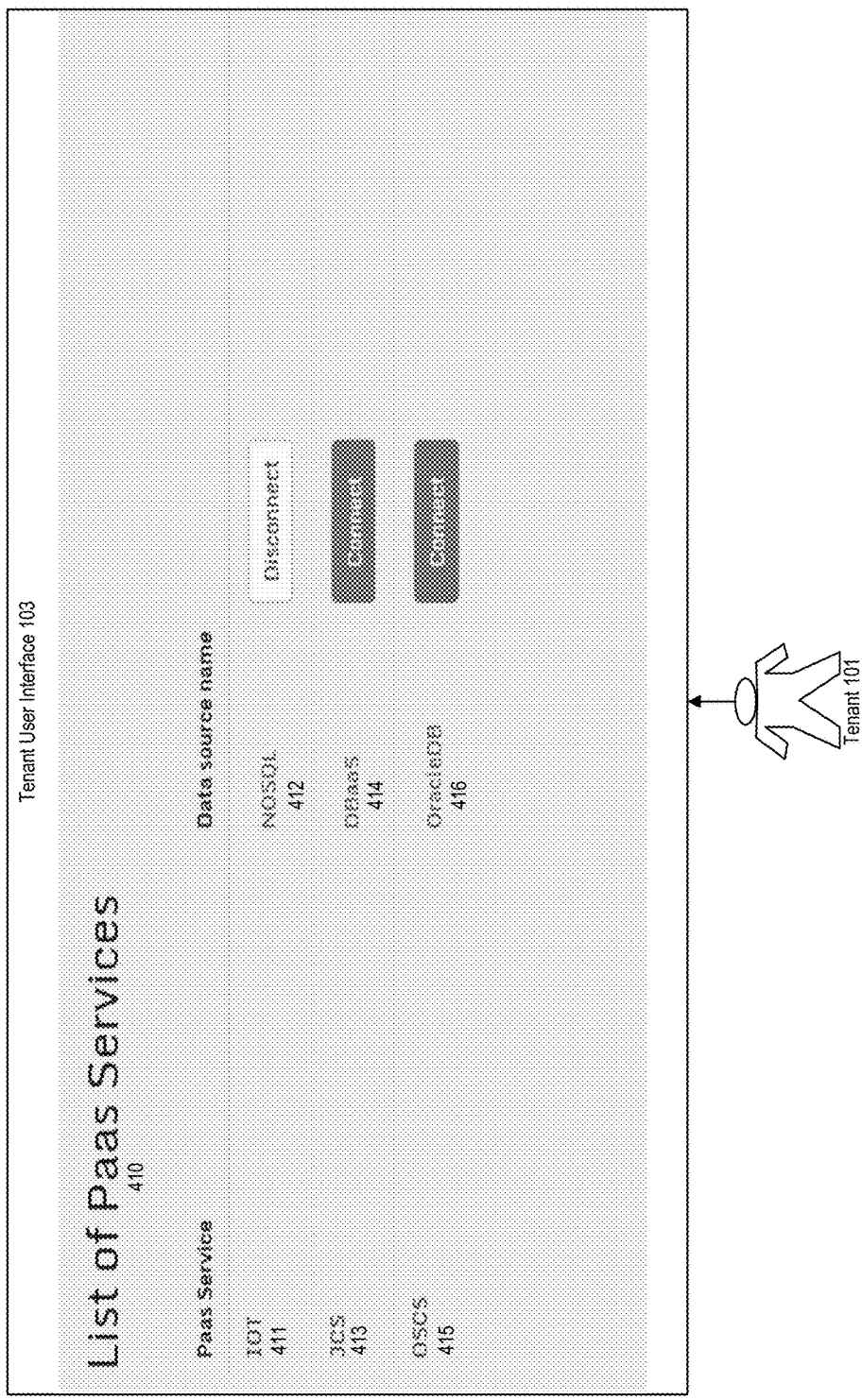
FIGS. 4A-4E illustrate example user interfaces for use by a PaaS tenant, in accordance with an embodiment.

In accordance with an embodiment, FIG. 4A shows a list of PaaS services 410, for example, IOT 411, JCS 413, and OSCS 415, that the tenant 101 has provisioned in the cloud environment described in FIG. 1.

As shown in FIG. 1, each PaaS service can be associated with a data source, for example, NoSQL 412, DBaaS 414, and OracleDB 416. Each data source can represent a data storage service used to store enterprise data from the PaaS service, and can be associated with a clickable item, e.g., a button, for use by the EDD to connect to, or disconnect from the data source. When the tenant uses the button to connect the EDD to the data source, the tenant can be prompted to enter connection details for the associated data source in a user interface to establish a connection between the EDD and the data source.

In accordance with an embodiment, regardless which data source the tenant chooses to connect to, the tenant can be prompted to enter just connection details for that data source in a same user interface. The EDD can use an EDD PaaS connector for the data source (for example, an EDD PaaS connection for NoSQL), to connect to the data source.

Figure 4B:
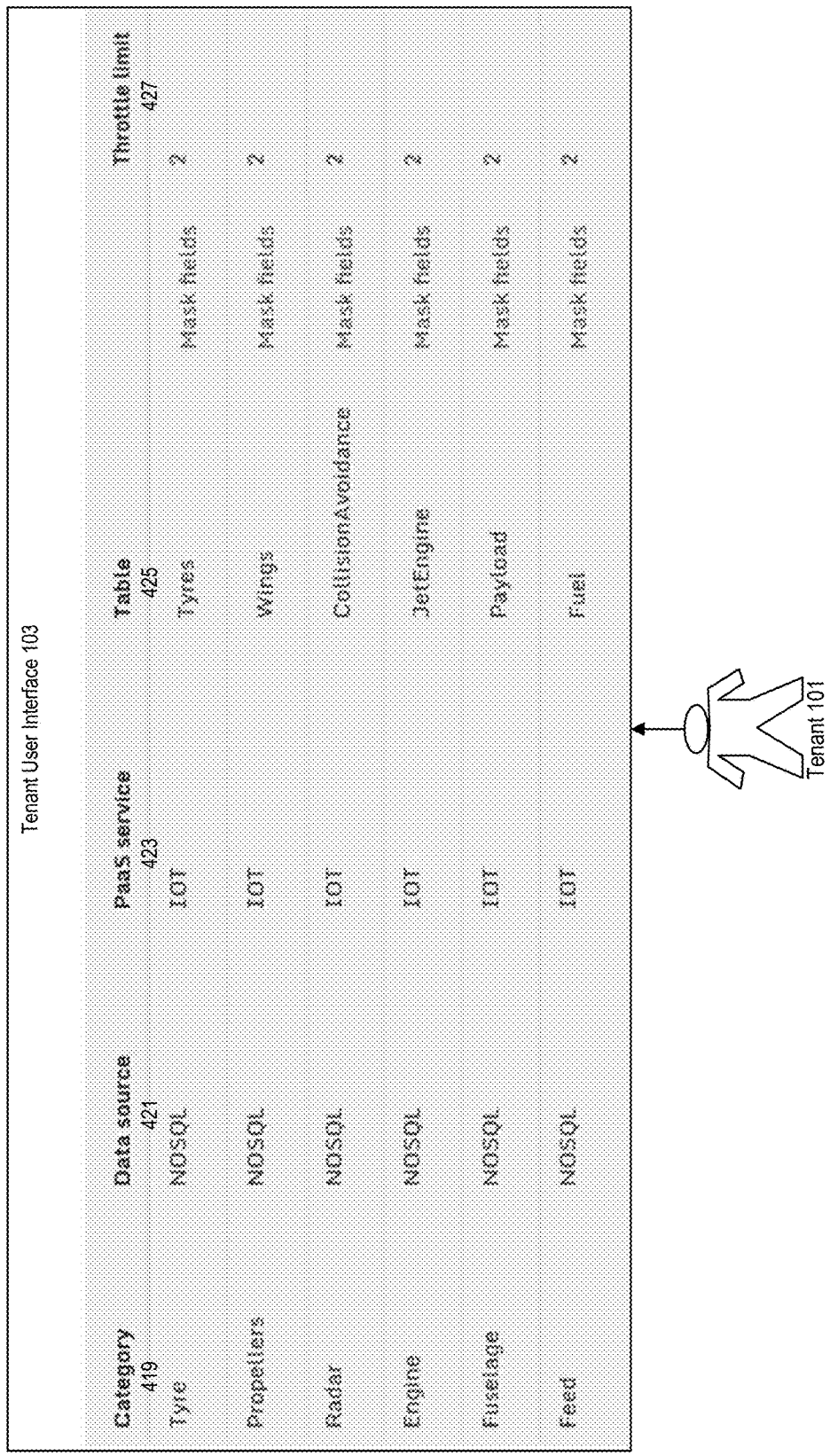

FIG. 4B illustrates information in a tabular format for enterprise data in a NoSQL data source for an IOT PaaS service. The tabular information can include a category column 419, a data source column 421, a PaaS service column 423, a table column 425, and a throttle limit column 427.

In the category column, a plurality of enterprise data categories are displayed, each category corresponding to a table or a set of tables in the NoSQL data source. The throttle limit column can define a limit of consumption for each enterprise data category.

For example, a throttle limit can specify a number of days in a month, or a time frame (e.g., from 8:30 AM to 10:30 AM) in a day, that a particular category of enterprise data can be consumed by a data consumer.

The throttle limit can be used to ensure data consistency by preventing data consumers from consuming enterprise data during certain periods of time, as regular system maintenance may be scheduled during those periods of time. The throttle limit can also be used to ensure system performance by preventing a large number of data consumers from downloading enterprise data at the same time. A category of enterprise data can be large in size. A large number of data consumers downloading data from the EDD may slow down the performance of the EDD. The throttle limit is available only for a batch data package subscription plan. A real-time stream package does not have a throttle limit.

In accordance with an embodiment, the tabular information can be retrieved and manipulated using the REST APIs 102. For example, the "/tables" API can be used to obtain a list of available tables in a data source. The "/categories/" API can be used to map a table or a set of tables to a particular enterprise data category. The masking API can be used to mask one or more fields that are irrelevant to a particular data consumer in accordance with rules (for example, legal or business rules) set by the tenant.

Figure 4C:
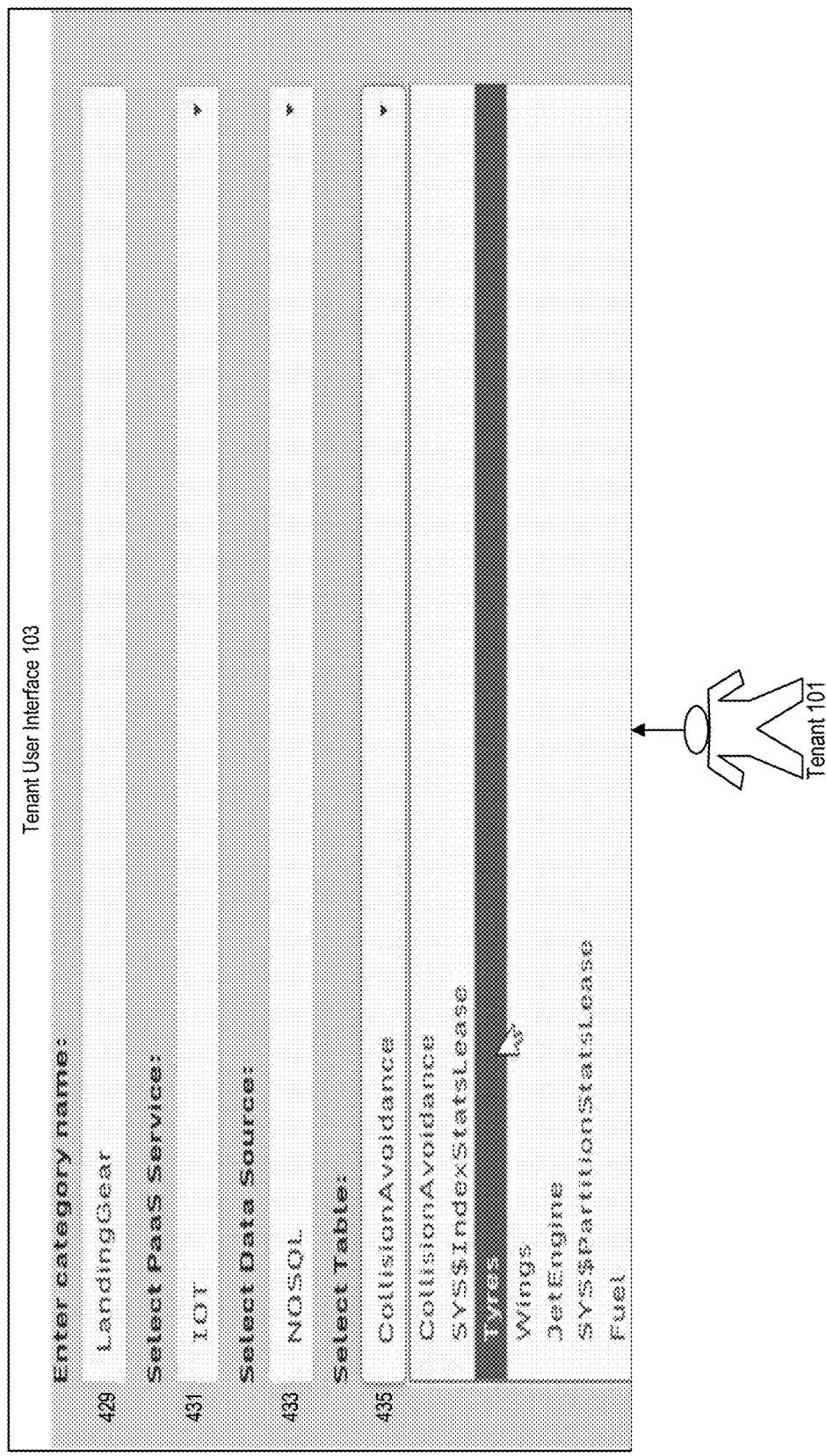
Figure 4D:
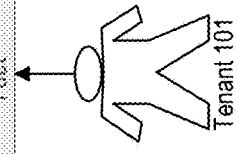

FIG. 4C shows that a PaaS tenant can add a new data category "LandingGear" 429 for PaaS service IOT 431 associated with a NoSQL 433 data source. The newly added data category can be associated with the table "Tyres" in the "NoSQL" data source. FIG. 4D shows that the newly added data category "LandingGear" 437 has been added for subscription by data consumers, with a throttle limit of 2 days per month.

Figure 4E:
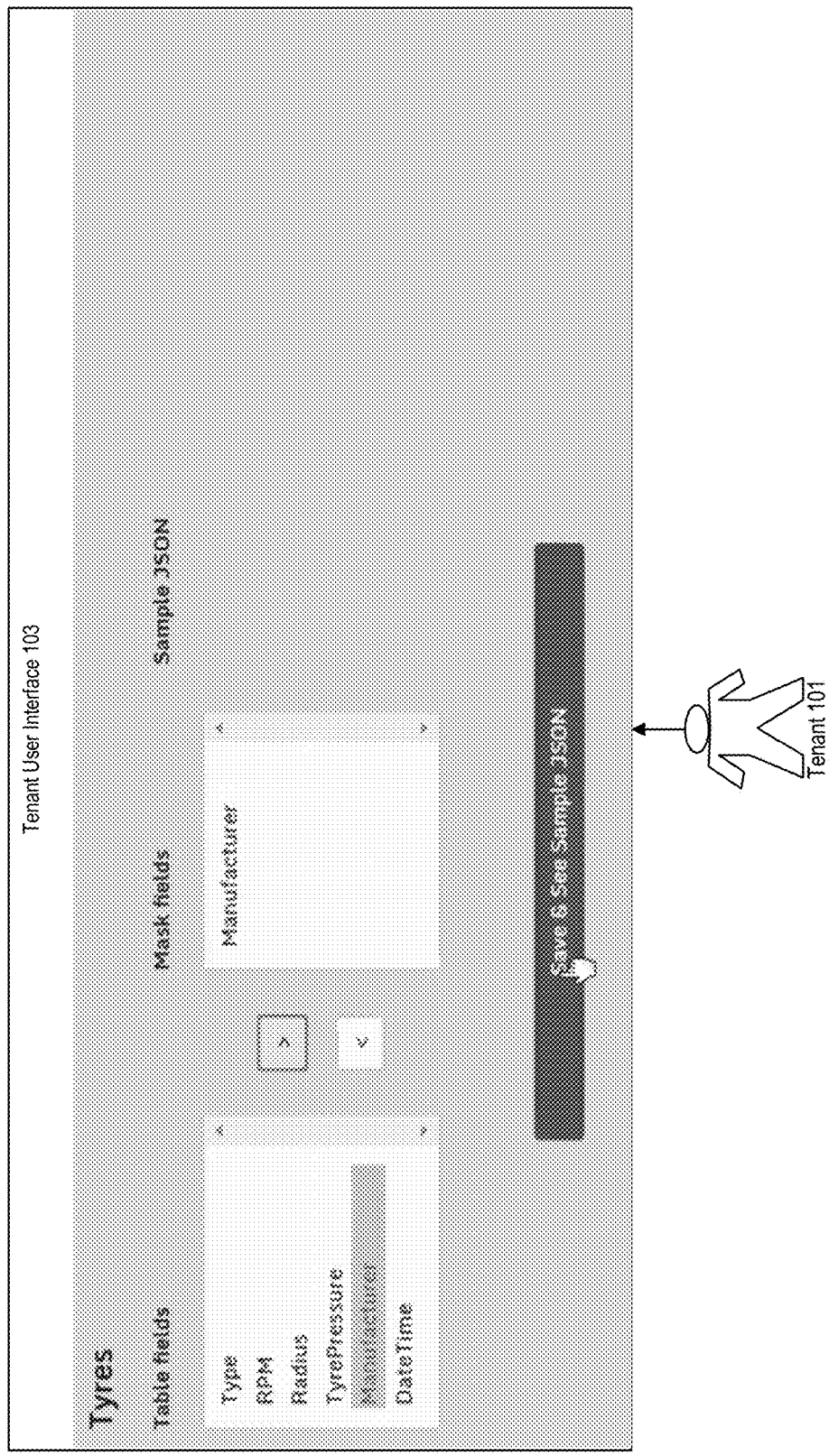

In FIG. 4E, an enterprise data category "Tyres" has been selected to have one or more fields masked. As shown in the figure, "manufacture" is masked if the tenant does not want the data consumer of the enterprise data category to view the information.

After a field has been selected to be masked, the tenant can save the category and view the data to determine if the data is in an intended format.

Figure 5A:
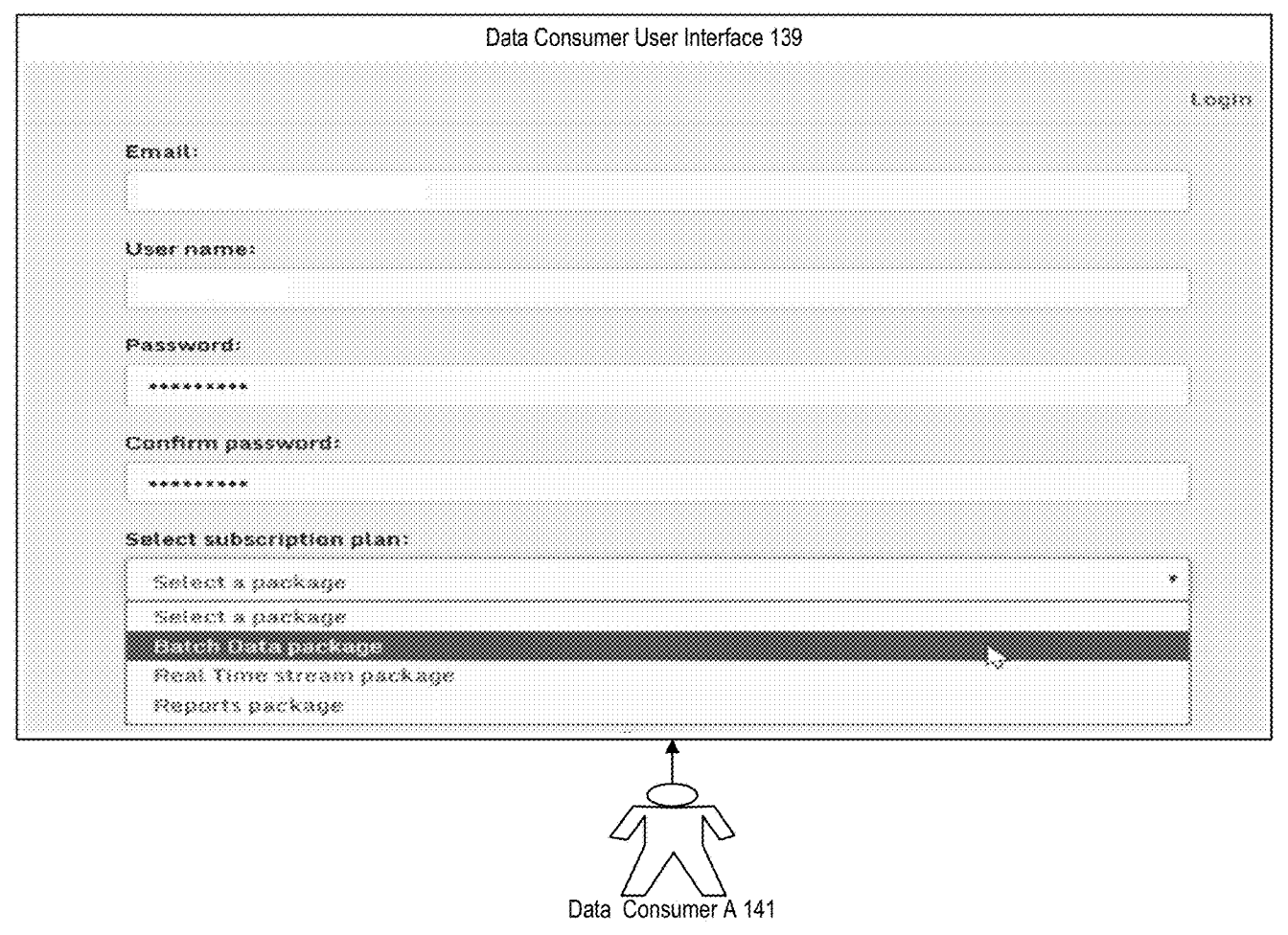
Figure 5B:
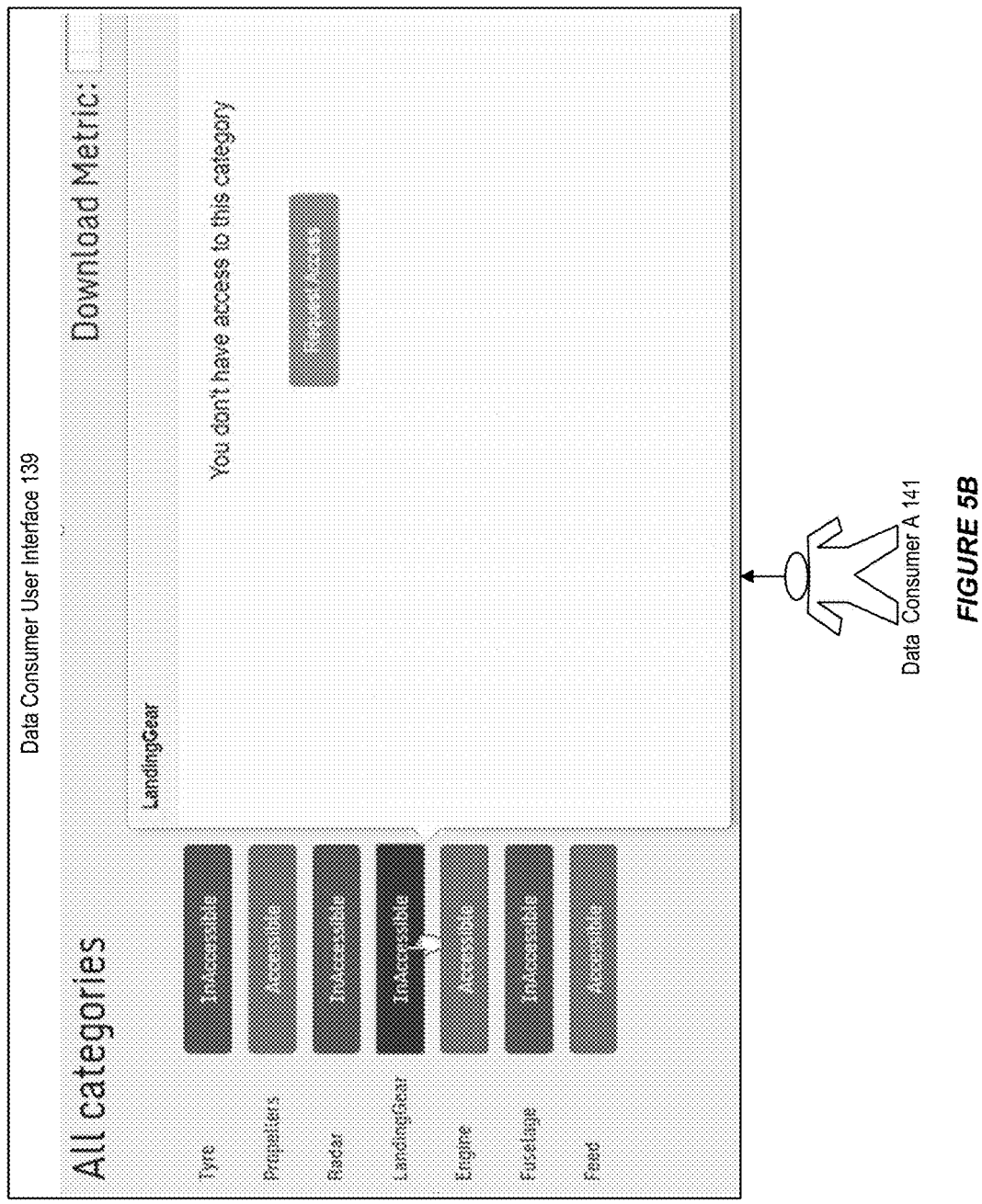
Figure 5C:
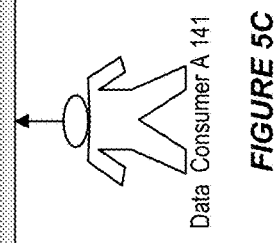

FIGS. 5A-5C illustrate example user interfaces for use by a data consumer, in accordance with an embodiment.

As shown in FIG. 5A, a data consumer 141 can register/sign up with a PaaS tenant on the EDD cloud service. As part of the registration process, the data consumer needs to select a subscription plan. After a data consumer signs up, the PaaS tenant can manage the identity of the data consumer using a username password combo, or an IDM cloud service.

In FIG. 5B, a catalogue of enterprise data categories can be displayed for a data consumer 141. The categories marked "accessible" are categories to which the PaaS tenant has granted access to the data consumer. The categories marked "Inaccessible" are categories that the data consumer is not allowed to access.

As such, when the data consumer clicks on the category of "LandingGear", a window can pop up reminding the data consumer that the data consumer does not have access to the category, and that the data consumer can request access to the category. An access request can be displayed on the tenant user interface. The PaaS tenant can determine whether to approve or reject the access request.

In FIG. 5C, the PaaS tenant has approved the data consumer's request for accessing the "LandingGear" category. When the data consumer clicks on the category, one or more throttle limits for the category can be displayed.

As shown in FIG. 5C, the "LandingGear" category can be accessed for two days in a month. When the data consumer selects "08/01/2016" as the start date, the EDD can automatically populate the end date field with "8/3/2016" based on the two-day throttle limit. The automatic population of End Date based on a throttle limit can be overwritten if a data consumer needs data for a lesser time than the throttle limit.

In accordance with an embodiment, a scheduled time interval on a particular day during the two-day access period can also be specified. For example, as shown in FIG. 5C, on Aug. 3, 2016, the category "LandingGear" is available for download between 19:00 and 19:30. A download link can also be displayed for the data consume to download the category of enterprise data.

In accordance with an embodiment, the EDD can maintain the data downloaded for each data consumer, and the downloaded data can be available for the PaaS tenant to view in the tenant user interface. A data consumer can be billed based on the size of the downloaded data, and/or types of categories of enterprise data.

In accordance with an embodiment, a data consumer can use the REST APIs 117 described above to access the enterprise data. For example, the "/categories" API can be used to obtain a catalog of categories exposed by the EDD. The "/services/ServiceName" API can be used to request access to a category. The access to the category can be requested using a POST call on the/services/SerivceName" API. Once an access request is received by a PaaS tenant, the PaaS tenant can either allow or disallow the access request for the category, and the data consumer that made the access request can get a response indicating whether the access request has been granted.

If a data consumer is allowed to access a particular category of enterprise data, the data consumer can use the "/data/{categoryName}?start=DATE&end=DATE" API call to obtain the category of data. The EDD can perform an internal validation of the request by invoking the category authorization component in the EDD, and obtain the data from the connected data source by invoking the data access component, subject to the data masking rules in the data masking component.

Figure 6:
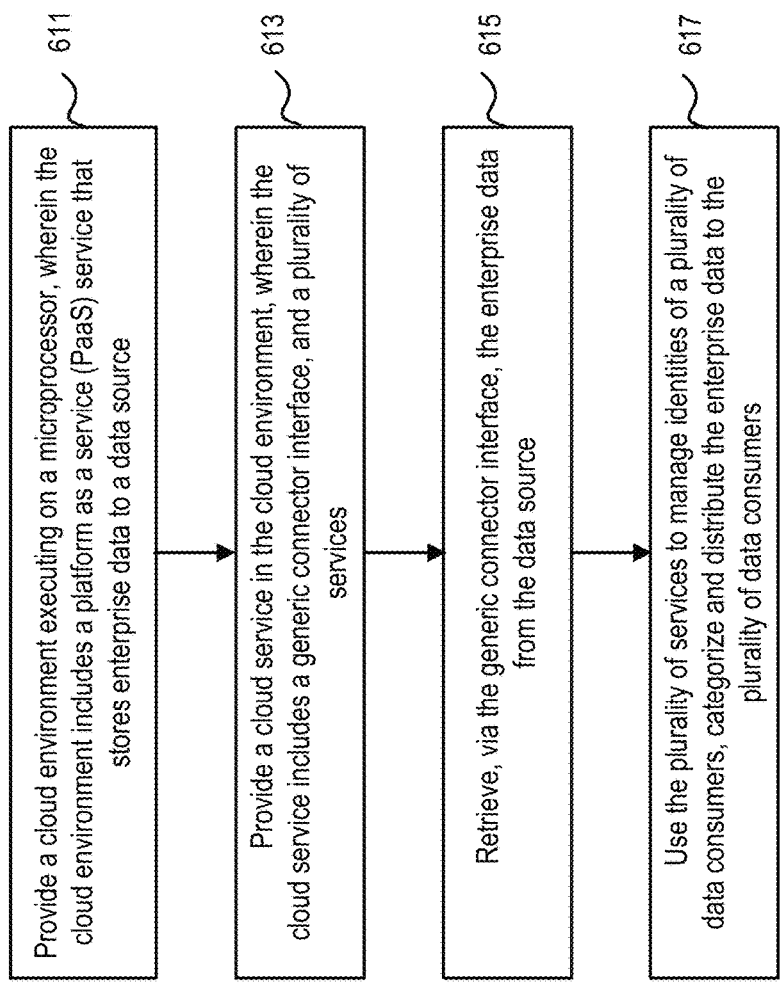
FIG. 6 illustrates a method for distributing enterprise data using a cloud service, in accordance with an embodiment.

FIG. 6 illustrates a method for distributing enterprise data using a cloud service, in accordance with an embodiment.

As shown in FIG. 6, at step 611, a cloud environment executing on a microprocessor is provide, wherein the cloud environment includes a platform as a service (PaaS) service that stores enterprise data to a data source.

At step 613, a cloud service is provided in the cloud environment, wherein the cloud service includes a generic connector interface and a plurality of services.

At step 615, the enterprise data is retrieved from the data source using the generic connector interface.

At step 617, the plurality of services are used to manage identities of a plurality of data consumers, categorize and distribute the enterprise data to the plurality of data consumers.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for distributing enterprise data using a cloud service, comprising:
   a microprocessor;
   a cloud environment executing on the microprocessor, wherein the cloud environment includes a platform as a service (PaaS) service that stores enterprise data to a data source, wherein the data source includes an endpoint table; and
   a data distribution cloud service in the cloud environment, wherein the endpoint table of the data source is exposed to the data distribution cloud service for access by the data distribution cloud service, and wherein the data distribution cloud service includes
   a data consumer user interface;
   a generic connector interface configured to connect to the data source, and retrieve the enterprise data from the endpoint table of the data source, and to list a selectable category of the enterprise data on the data consumer user interface, wherein the selectable category represents a retrievable set of the enterprise data, and
   a data access component that distributes the retrievable set of the enterprise data to a data consumer in response to a call from a first representational state transfer (REST) application programming interface (API) of the data consumer user interface.

2. The system of claim 1, further comprising:
   a plurality of representational state transfer (REST) application programming interfaces (APIs) for a PaaS tenant.

3. The system of claim 2, wherein the data consumer registers with the cloud service using a second REST API.

4. The system of claim 1, wherein the cloud service is a data as a service (DaaS).

5. The system of claim 1, further comprising:
   a registration and identity management service, a category authorization service, and a data masking service.

6. The system of claim 1, wherein the data source is one of a plurality of data storage service including a NoSQL, a database as a service (DBaaS), or an OracleDB.

7. The system of claim 1, wherein the PaaS service is one of an Internet of Things (IOT) service, a Java Cloud Service (JCS), or a Storage Cloud Service.

8. A method for distributing enterprise data using a cloud service, comprising:
   providing a cloud environment executing on a microprocessor, wherein the cloud environment includes a platform as a service (PaaS) service that stores enterprise data to a data source, wherein the data source includes an endpoint table;
   providing a data distribution cloud service in the cloud environment, wherein the endpoint table of the data source is exposed to the data distribution cloud service for access by the data distribution cloud service, and wherein the data distribution cloud service includes a data consumer user interface;
a generic connector interface, and
a data access component;
connecting, by the generic connector, to the data source;
retrieving, by the generic connector, the enterprise data from the endpoint table of the data source;
listing, by the generic connector, a selectable category of the enterprise data on the data consumer user interface, wherein the selectable category represents a retrievable set of the enterprise data; and
distributing, by the data access component, the retrievable set of the enterprise data to a data consumer in response to a call from a first representational state transfer (REST) application programming interface (API) of the data consumer user interface.

9. The method of claim 8, further comprising:
providing a plurality of representational state transfer (REST) application programming interfaces (APIs) for a PaaS tenant.

10. The method of claim 9, wherein the data consumer registers with the cloud service using a second REST API.

11. The method of claim 8, wherein the cloud service is a data as a service (DaaS).

12. The method of claim 8, wherein the data distribution cloud service includes a registration and identity management service, a category authorization service, and a data masking service.

13. The method of claim 8, wherein the data source is one of a plurality of data storage service including a NoSQL, a database as a service (DBaaS), or an OracleDB.

14. The method of claim 8, wherein the PaaS service is one of an Internet of Things (IOT) service, a Java Cloud Service (JCS), or a Storage Cloud Service.

15. A non-transitory computer readable storage medium, including instructions stored thereon which when read and executed by one or more computers cause the one or more computers to perform the method comprising:
providing a cloud environment executing on a microprocessor, wherein the cloud environment includes a platform as a service (PaaS) service that stores enterprise data to a data source, wherein the data source includes an endpoint table;
providing a data distribution cloud service in the cloud environment, wherein the endpoint table of the data source is exposed to the data distribution cloud service for access by the data distribution cloud service, and wherein the data distribution cloud service includes
a data consumer user interface;
a generic connector interface, and
a data access component;
connecting, by the generic connector, to the data source;
retrieving, by the generic connector, the enterprise data from the endpoint table of the data source;
listing, by the generic connector, a selectable category of the enterprise data on the data consumer user interface, wherein the selectable category represents a retrievable set of the enterprise data; and
distributing, by the data access component, the retrievable set of the enterprise data to a data consumer in response to a call from a first representational state transfer (REST) application programming interface (API) of the data consumer user interface.

16. The non-transitory computer readable storage medium of claim 15, further comprising:
providing a plurality of representational state transfer (REST) application programming interfaces (APIs) for a PaaS tenant.

17. The non-transitory computer readable storage medium of claim 16, wherein the data consumer registers with the cloud service using a second REST API.

18. The non-transitory computer readable storage medium of claim 15, wherein the cloud service is a data as a service (DaaS).

19. The non-transitory computer readable storage medium of claim 15, wherein the data distribution cloud service includes a registration and identity management service, a category authorization service, and a data masking service.

20. The non-transitory computer readable storage medium of claim 15, wherein the data source is one of a plurality of data storage service including a NoSQL, a database as a service (DBaaS), or an OracleDB.

* * * * *